No. 808,393. PATENTED DEC. 26, 1905.
R. H. LEWIS & H. M. SMITH.
DRINKING FOUNT FOR LIVE STOCK.
APPLICATION FILED JUNE 16, 1905.
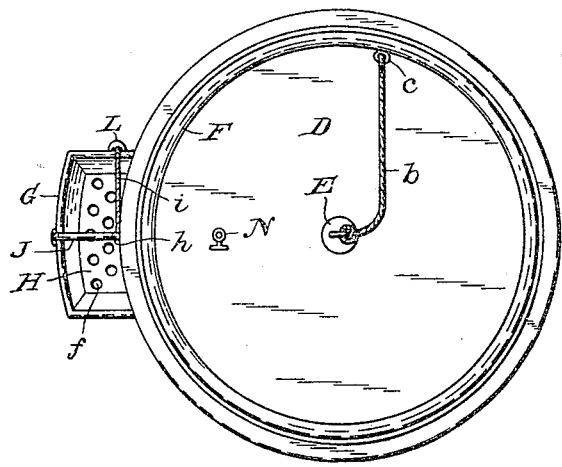
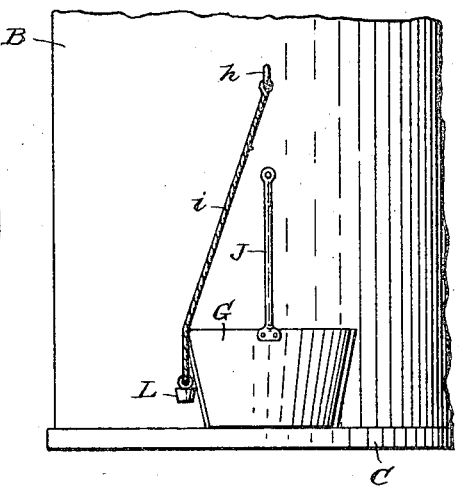
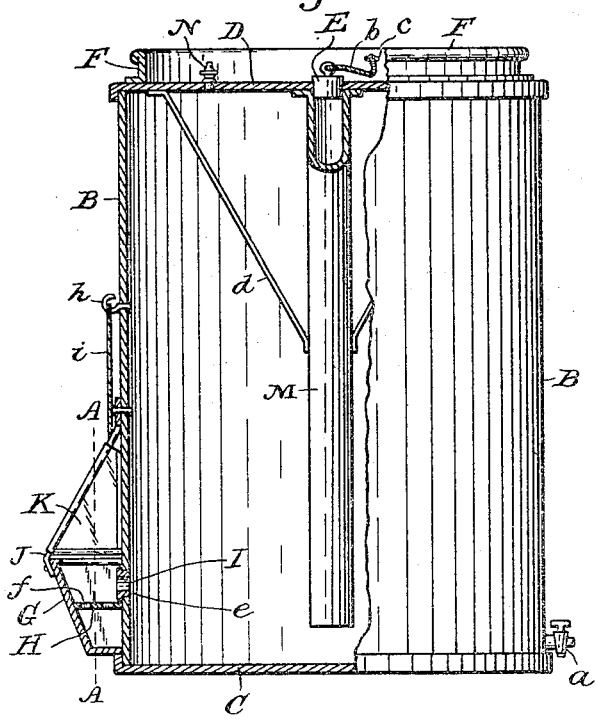
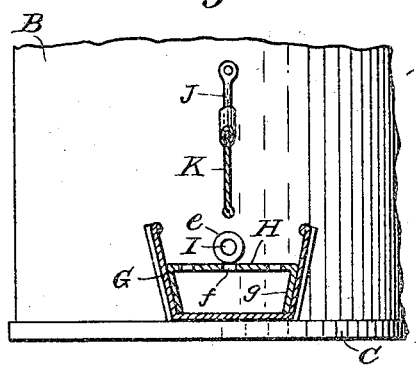
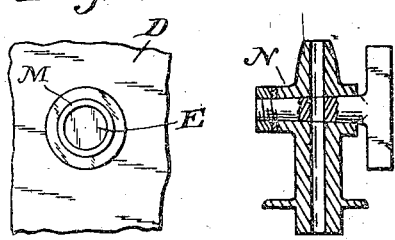
Witnesses:
Wm C. Thompson
Stella Snider
Inventors
Robert H. Lewis,
Harvey M. Smith,
by E. F. Silvius
Attorney

UNITED STATES PATENT OFFICE.

ROBERT H. LEWIS AND HARVEY M. SMITH, OF MONROVIA, INDIANA.

DRINKING-FONT FOR LIVE STOCK.

No. 808,393.        Specification of Letters Patent.        Patented Dec. 26, 1905.

Application filed June 16, 1905. Serial No. 265,481.

*To all whom it may concern:*

Be it known that we, ROBERT H. LEWIS and HARVEY M. SMITH, citizens of the United States, residing at Monrovia, in the county of Morgan and State of Indiana, have invented new and useful Improvements in Drinking-Fonts for Live Stock; and we do declare the following to be a full, clear, and exact description of the invention, reference being had to the accompanying drawings, and to the letters of reference marked thereon, which form a part of this specification.

This invention relates to fonts from which animals and fowls may drink, the invention having reference particularly to the water-supply tank and to the drinking-trough comprising the complete font.

The objects of the invention are to provide an improved drinking-font in which the drinking-trough will be always filled for use automatically without requiring troublesome and expensive valves and operating devices therefor, to provide an improved closed font-tank that may be readily supplied with water either by means of hose or pipes or by means of buckets without necessitating the use of a funnel which at times may not be conveniently at hand, to provide an improved font-trough that will furnish reasonably clean water by retaining all sediment out of reach of the animals while drinking, and to provide a trough which swine cannot get into nor splash sufficient water out of to form puddles in which to wallow; and a further and equally-important object is to provide a drinking-font for live stock which may be manufactured so cheaply as to induce live-stock owners to provide ample means for watering their stock and fowls, which font shall be capable of keeping the water pure and be durable and economical in use.

The invention comprises a closed supply-tank of improved construction having an outlet-orifice near its bottom and having also a filling-aperture normally closed air-tight and an improved drinking-trough attached to the exterior of the supply-tank opposite to the outlet-orifice thereof and in communication with the interior of the supply-tank through the orifice; and the invention consists, further, in the novel parts and in the novel combinations and arrangements of parts, as hereinafter particularly described and claimed.

Referring to the drawings, Figure 1 represents a top plan of the improved font; Fig. 2, a fragmentary front elevation thereof; Fig. 3, a side elevation of the font partly broken away and showing the drinking-trough and portions of the supply-tank in central vertical section; Fig. 4, a fragmentary sectional elevation on the line A A in Fig. 3; Fig. 5, a fragmentary plan showing a portion of the top of the supply-tank inverted and having the filling-tube thereon, and Fig. 6 a sectional view of the vent-cock of the supply-tank.

Similar reference characters in the various figures of the drawings designate corresponding elements or features.

In construction the supply-tank comprises a circular metallic body B of suitable diameter and length having a tight bottom C and adapted to set uprightly, there being a drain-cock $a$ near the bottom, a top D being secured tightly to the body B and having a filling-aperture therein fitted with a plug E, the plug being attached to a cord or chain $b$. A flanged rim or ledge F is secured on the top D and forms therewith a basin to receive the water when replenishing the supply-tank, the water gradually flowing through the filling-aperture into the supply-tank. An eye $c$ is secured to the ledge and has the cord $b$ attached thereto.

The drinking-trough G is formed partly by the body B and partly by metallic parts forming a front, bottom, and ends of the trough, the ends and bottom being attached to the body B, and in the trough is a perforate false bottom H, arranged somewhat above the bottom proper of the trough. The body B has an outlet-orifice I therein arranged in a plane between the false bottom H and the top of the trough, the orifice forming a normally open channel between the supply-tank and the drinking-trough and preferably having a stopper-seat $e$ of suitable length to firmly hold a stopper in the orifice. The false bottom H is formed of sheet metal having perforations $f$ therein and having legs $g$, that rest on the bottom of the trough for its support; but the false bottom may obviously be formed of wire-netting, if preferred. The trough is of suitable length, so that preferably two or more animals may drink therefrom at the same time, and its front is inclined so that it extends outwardly from the body B somewhat farther at its top than at its bottom, and the trough is provided with a combined brace and guard comprising a rod J, that is secured to the front of the trough and also to the body B of the supply-tank, and a plate K, that is attached to the rod and also to the body B, the guard being designed to serve as a partition to keep the heads of the animals apart while drinking, as well as to prevent hogs from getting into the trough.

The body B of the supply-tank has a hook h attached thereto to which is connected a cord or chain i, having a stopper L (preferably of rubber) attached to its end, the stopper being designed to close the outlet-orifice I temporarily while the supply-tank may be replenished with water.

A filling-tube M is secured tightly to the top D at the filling-aperture, and it extends beyond or below the plane of the outlet-orifice I and nearly to the bottom C, the tube itself being formed so that its walls are airtight, its lower end being open and its upper end is closed by the plug E, which need not be air-tight when the tube is provided, the plug serving to prevent the entrance of insects, dust, and undesirable matter into the tube and the tank. A suitable number of braces d are attached to the tube M and also to the under side of the top D for preventing vibrations of the tube during shipments of the apparatus. A vent-cock N is attached to the top D for the escape of air from the tank while being filled, the cock being closed afterward in order to prevent the entrance of air into the tank while awaiting use of the water.

The use of the filling-tube M permits of the removal of the plug E without wasting water and without requiring the use of the stopper L when it may be desired to measure the quantity of water that may yet remain in the tank, and an undesirable volume of air is prevented from entering the tank, as would be the case were the tube absent. In some cases, however, it may be desirable to omit the tube, and then the plug E must form an air-tight closure and the vent-cock N will not then be required, since the open filling-aperture would serve as a vent while the water flows through it. When the tank is provided with the filling-tube, as will be seen, the use of the stopper L will not usually be needed when filling the tank.

It will be understood that various sealing devices or closures for the filling-aperture may be substituted for that shown, that the trough may be formed separately as a complete article and attached to the supply-tank, and that in the smaller sizes of fonts the drain-cock a may be dispensed with, all within the scope and intent of the invention.

In practical use the stopper L may be inserted into the outlet-orifice I, the plug E being removed from the inlet-aperture and the vent-cock N opened, when water may be conveyed in any convenient manner to the basin on the top of the supply-tank from which the water will flow into the supply-tank, which when supplied should be closed and sealed by the vent-cock N, and the plug E may be inserted in the filling-aperture, after which the stopper L should be withdrawn from the orifice I and left hanging over an end of the trough, or it may be placed out of the way on the top D of the supply-tank. The orifice I being unobstructed, atmospheric air will enter after vacuum has formed in the tank and rise in the water in the supply-tank to the top thereof, permitting water to flow through the orifice into the drinking-trough until the water therein rises sufficiently to close the orifice against the admission of air, when the flow will cease. When the animals drink, they may obtain only the water that may be above the false bottom H, and any dirty substance that hogs may carry on their snouts into the trough will settle through the false bottom into the lower part of the trough, from which it may be removed when convenient.

Having thus described the invention, what is claimed as new is—

1. A drinking-font comprising a supply-tank having an imperforate filling-tube attached tightly to the top thereof and extending nearly to the bottom thereof, a drinking-trough attached to the supply-tank, a normally open channel between the supply-tank and the drinking-trough, a ledge attached to the top of the supply-tank and extending about the opening of the upper end of the filling-tube, and a vent-cock attached to the top part of the supply-tank.

2. A drinking-font comprising a supply-tank having an imperforate filling-tube attached tightly to the top thereof and extending nearly to the bottom thereof, there being a ledge on the top of the supply-tank extending about the opening of the upper end of the filling-tube, a drinking-trough attached to the supply-tank, a normally open channel between the supply-tank and the drinking-trough, a vent-cock attached to the top part of the supply-tank, and a brace attached to the wall of the supply-tank and also to the top of the outer wall of the drinking-trough.

3. A drinking-font comprising a supply-tank with a basin on the top thereof, the top of the supply-tank forming the bottom of the basin, an imperforate filling-tube attached tightly to the top of the supply-tank and extending nearly to the bottom thereof, a plurality of braces secured to the under side of the top of the supply-tank and also secured to the filling-tube, a drinking-trough attached to the supply-tank, a normally open channel between the supply-tank and the drinking-trough, and a vent-cock attached to the top part of the supply-tank.

4. A drinking-font comprising a supply-tank having a filling-tube attached to the top thereof and extending nearly to the bottom thereof, an annular ledge upon the top of the supply-tank, a drinking-trough attached to the supply-tank, a perforate false bottom supported removably in the drinking-trough above the natural bottom thereof, a normally open channel between the supply-tank and the drinking-trough, a vent-cock attached to the top part of the supply-tank, braces attached to the filling-tube and also to the top of the supply-tank, and a combined guard and brace secured to the wall of the supply-tank and extending across the drinking-trough and secured thereto.

5. A drinking-font comprising a supply-tank having a filling-tube attached to the top thereof and extending nearly to the bottom thereof, a closure for the filling-tube, a drinking-trough attached to the supply-tank, a perforate false bottom supported removably in the drinking-trough above the natural bottom thereof, a normally open channel between the supply-tank and the drinking-trough, a vent-cock attached to the top part of the supply-tank, a guard-plate attached to the wall of the supply-tank and extending across the drinking-trough, and a brace-rod attached to the wall of the supply-tank and also to the drinking-trough and to the guard-plate.

In testimony whereof we affix our signatures in presence of two witnesses.

ROBT. H. LEWIS.
HARVEY M. SMITH.

Witnesses:
JOSEPH G. BOWEN,
GEORGE BRAY.